United States Patent
Lee

(10) Patent No.: US 8,528,944 B2
(45) Date of Patent: Sep. 10, 2013

(54) STOPPER GRIP RING FOR PLUMBING PIPES

(71) Applicant: Jung Woo Metal Ind. Co., Ltd., Yangju-si (KR)

(72) Inventor: Kwang-Won Lee, Seoul (KR)

(73) Assignee: Jung Woo Metal Ind. Co., Ltd., Yangju-si (KR)

( * ) Notice: Subject to any disclaimer, the term of this patent is extended or adjusted under 35 U.S.C. 154(b) by 0 days.

(21) Appl. No.: 13/755,619

(22) Filed: Jan. 31, 2013

(65) Prior Publication Data

US 2013/0200613 A1 Aug. 8, 2013

(30) Foreign Application Priority Data

Feb. 3, 2012 (KR) .................. 10-2012-0011227

(51) Int. Cl.
*F16L 19/12* (2006.01)
(52) U.S. Cl.
USPC .......................................... 285/340; 285/349
(58) Field of Classification Search
USPC .......................................... 285/232, 340, 349
See application file for complete search history.

(56) References Cited

U.S. PATENT DOCUMENTS

| | | | | |
|---|---|---|---|---|
| 2,613,086 | A | * | 10/1952 | Wolfram ........................ 285/232 |
| 4,181,329 | A | * | 1/1980 | Helm ................................. 285/3 |
| 4,676,533 | A | * | 6/1987 | Gerondale ................... 285/139.2 |
| 5,310,223 | A | * | 5/1994 | Straub ............................ 285/112 |
| 6,367,802 | B1 | * | 4/2002 | Knapp ............................ 277/314 |
| 7,316,429 | B2 | | 1/2008 | Viegener |
| 7,490,866 | B2 | * | 2/2009 | Webb et al. .................... 285/340 |
| 7,866,707 | B2 | * | 1/2011 | Sudar ............................. 285/112 |
| 8,292,331 | B2 | * | 10/2012 | Sudar ............................. 285/104 |
| 2004/0150225 | A1 | * | 8/2004 | Roberts et al. ................ 285/340 |
| 2007/0075542 | A1 | | 4/2007 | Glaze et al. |

FOREIGN PATENT DOCUMENTS

| | | | |
|---|---|---|---|
| JP | 01275991 | A * | 11/1989 |
| KR | 1020070120960 | A | 12/2007 |
| KR | 1020100073424 | A | 7/2010 |
| WO | 2009/108963 | A2 | 9/2009 |

\* cited by examiner

*Primary Examiner* — James Hewitt
(74) *Attorney, Agent, or Firm* — Volpe and Koenig, P.C.

(57) ABSTRACT

A stopper grip ring for plumbing pipes. A stopper grip ring for plumbing pipes, according to an exemplary embodiment of the present disclosure, includes: an outer circumferential portion which forms an outer diameter of a ring shape; an O-ring supporting portion formed to be bent at one side of the outer circumferential portion so as to come into contact with an O-ring and having an entry inducing portion which is formed to be inclined at one end portion, and an inserting portion which is formed at the other end portion and enters while being induced by the entry inducing portion; and a stopper portion formed to be bent at the other side of the outer circumferential portion so as to be spaced apart from the O-ring supporting portion and having a sharpened portion which is formed at an edge and is divided by a plurality of slits.

4 Claims, 6 Drawing Sheets

STOPPER GRIP RING FOR PLUMBING PIPES

CROSS-REFERENCE TO RELATED APPLICATIONS

This application is based on and claims priority from Korean Patent Application No. 10-2012-0011227, filed on Feb. 3, 2012, with the Korean Intellectual Property Office, the disclosure of which is incorporated herein in its entirety by reference.

TECHNICAL FIELD

The present disclosure relates to a stopper grip ring for plumbing pipes, and more particularly, to a stopper grip ring for plumbing pipes, which prevents pipes from being moved away from each other and aligns an O-ring when both pipes are connected by making the pipes face each other and providing a connector socket at an outer diameter portion thereof.

BACKGROUND

In general, in order to connect pipes, a method of welding pipes or fastening pipes after forming screw threads at end portions of the pipes has been used in accordance with materials of the pipe. However, there is a problem in that large costs and labor are required in this pipe connection technology.

As a technology presented to solve the aforementioned problem, a technology has been known in which one pipe and the other pipe are made face to each other, a connector socket is provided at an outer diameter of the facing pipes, and an O-ring is provided between the connector socket and the pipe.

Here, a condition that the pipe and the connector socket are not separated from each other needs to be satisfied, and an abnormal distortion of the O-ring needs to be prevented in order to maintain an airtight state.

However, according to a known technology, a stopper grip ring is used to prevent the pipe and the connector socket from being separated from each other. The stopper grip ring does not have a complete circular shape but have a C shape of which one side is opened. Therefore, in a case in which the stopper grip ring is provided at one side of the O-ring, there is a problem in that an end portion of the stopper grip ring causes damage to a part of the O-ring when the stopper grip ring is made narrower or broader.

Meanwhile, as a known technology presented to solve the aforementioned problem concerning damage to the O-ring, there is a technology in which a separating ring is further disposed between the stopper grip ring and the O-ring. However, because the number of components is increased in a case in which the separating ring is further provided, there is a problem in that costs for connecting pipes are increased.

Alternatively, as a technology that substitutes for the function of the separating ring, a technology has been known in which a part of the connector socket protrudes in an inner diameter direction when the connector socket is formed, the O-ring is disposed at one side of the protruding portion, and the stopper grip ring is disposed at the other side of the protruding portion. However, in a case in which a seat for receiving the O-ring is independently formed at a part of an end portion of the connector socket, there is a problem in that forming is difficult due to a complicated shape, special jigs and tools also need to be provided to process the special shape, and dimensional accuracy of the shape deteriorates because the specific shape is formed by repeatedly bending metal.

LITERATURE OF RELATED ART

Patent Literature (Patent Literature 1) U.S. Pat. No. 7,316,429 (Jul. 8, 2008)

SUMMARY

The present disclosure has been made in an effort to provide a stopper grip ring for plumbing pipes, capable of performing a compound operation in which deformation/damage of an O-ring to provide airtightness is prevented, and a pipe and a connector socket are prevented from being separated from each other when connecting the pipes by disposing the connector socket at an outer diameter portion of the pipe.

Objects of the present disclosure are not limited to the objects described above, and other objects that are not described will be clearly understood by a person skilled in the art from the description below.

An exemplary embodiment of the present disclosure provides a stopper grip ring for plumbing pipes, including: an outer circumferential portion which forms an outer diameter of a ring shape; an O-ring supporting portion formed to be bent at one side of the outer circumferential portion so as to come into contact with an O-ring and having an entry inducing portion which is formed to be inclined at one end portion, and an inserting portion which is formed at the other end portion and enters while being induced by the entry inducing portion; and a stopper portion formed to be bent at the other side of the outer circumferential portion so as to be spaced apart from the O-ring supporting portion and having a sharpened portion which is formed at an edge and is divided by a plurality of slits.

In the stopper grip ring for plumbing pipes, according to the exemplary embodiment of the present disclosure, an angle between the outer circumferential portion and the stopper portion may be an acute angle.

In the stopper grip ring for plumbing pipes, according to the exemplary embodiment of the present disclosure, the acute angle may be 50° to 70°.

In the stopper grip ring for plumbing pipes, according to the exemplary embodiment of the present disclosure, a first width of the stopper portion may be smaller than a second width of the outer circumferential portion, and may be greater than a third width of the O-ring supporting portion.

In the stopper grip ring for plumbing pipes, according to the exemplary embodiment of the present disclosure, the sharpened portion may have hardness greater than that of a pipe to be connected.

Details of other exemplary embodiments are included in the detailed description and the drawings.

According to the exemplary embodiment of the present disclosure, the stopper grip ring for plumbing pipes may prevent damage and abnormal deformation of the O-ring even in a case in which the O-ring is disposed at an end portion of the connector socket and the stopper grip ring is directly disposed at an outer side of the O-ring when connecting pipes by making one pipe and the other pipe face each other and disposing the connector socket at an outer diameter of an end portion of the pipe.

That is, the stopper grip ring for plumbing pipes, according to the exemplary embodiment of the present disclosure, may perform a compound operation in which deformation/damage of the O-ring to provide airtightness is prevented, and the pipe and the connector socket are prevented from being separated from each other.

Meanwhile, if such a pipe connection is performed by using the stopper grip ring for plumbing pipes, according to the exemplary embodiment of the present disclosure, costs and labor may be reduced because a separating ring in a known technology in the related art is not necessary.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
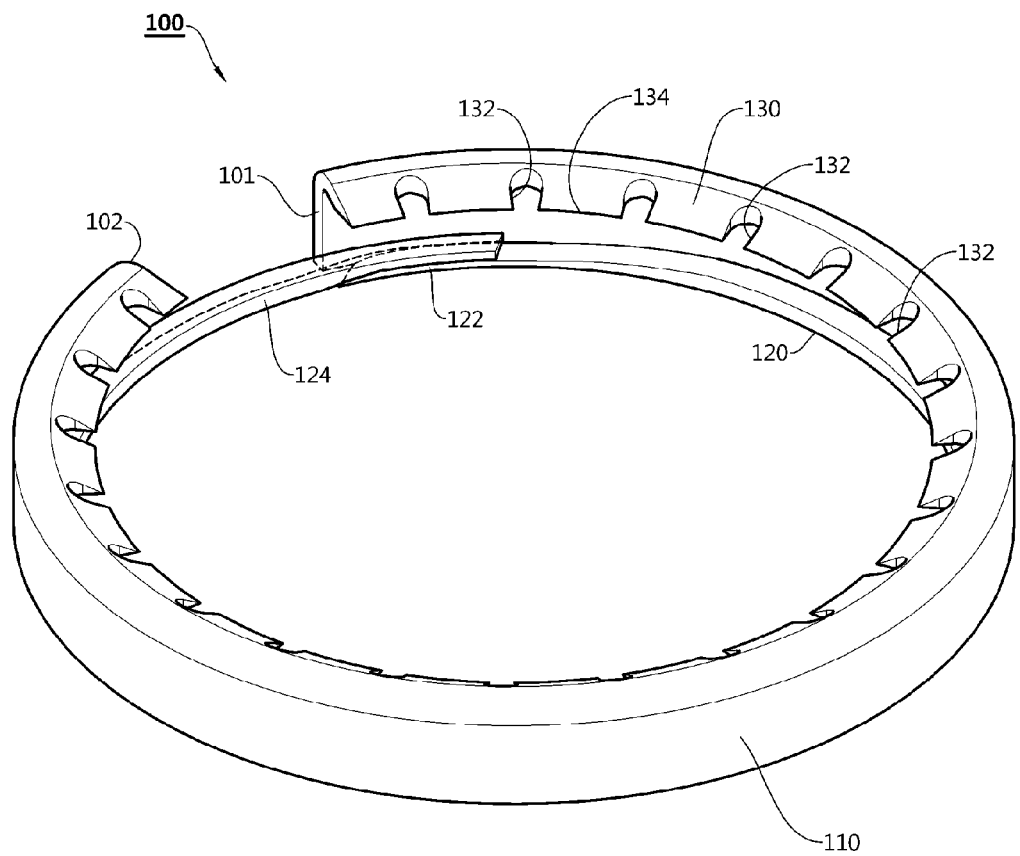
FIGS. 1 and 2 are perspective views for explaining a stopper grip ring for plumbing pipes, according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The advantages and characteristics of the present disclosure and methods for achieving the same will become clear from the exemplary embodiments set forth in detail below with reference to the attached drawings.

Like reference numerals represent like elements throughout the specification.

Meanwhile, the terms described below are defined in consideration of each function in the present disclosure, and may be changed in accordance with the intention of a manufacturer or the practice. Therefore, the definition of the terms should be determined based on the contents disclosed throughout the specification.

Hereinafter, a stopper grip ring for plumbing pipes, according to an exemplary embodiment of the present disclosure, will be described with reference to FIGS. 1 to 4.

Figure 2:
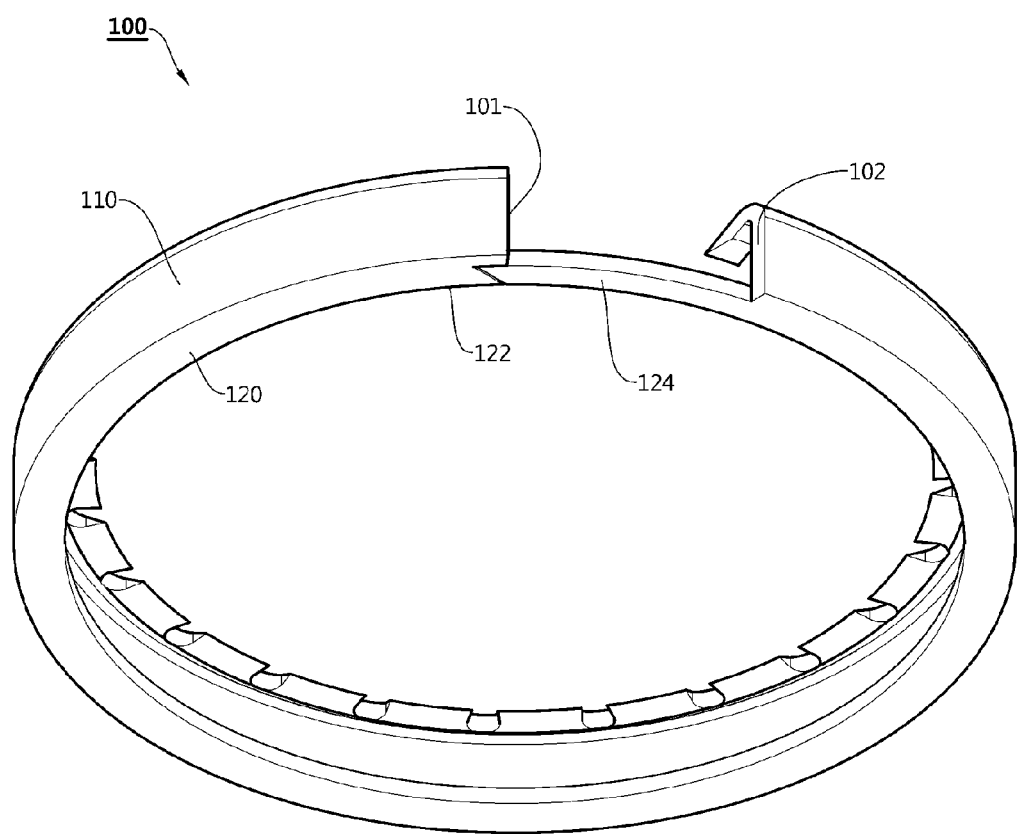
Figure 3:
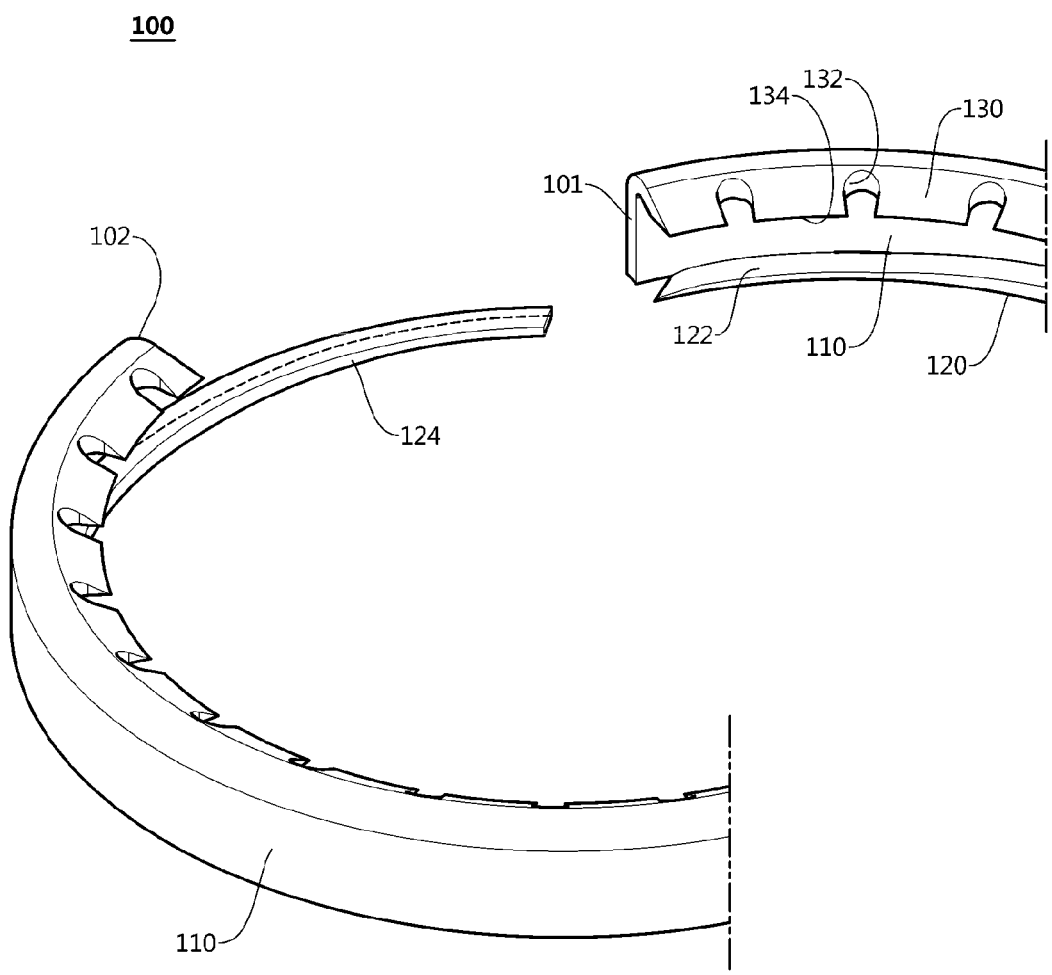
FIG. 3 is a detailed view for explaining both end portions of the stopper grip ring for plumbing pipes, according to the exemplary embodiment of the present disclosure.
Figure 4:
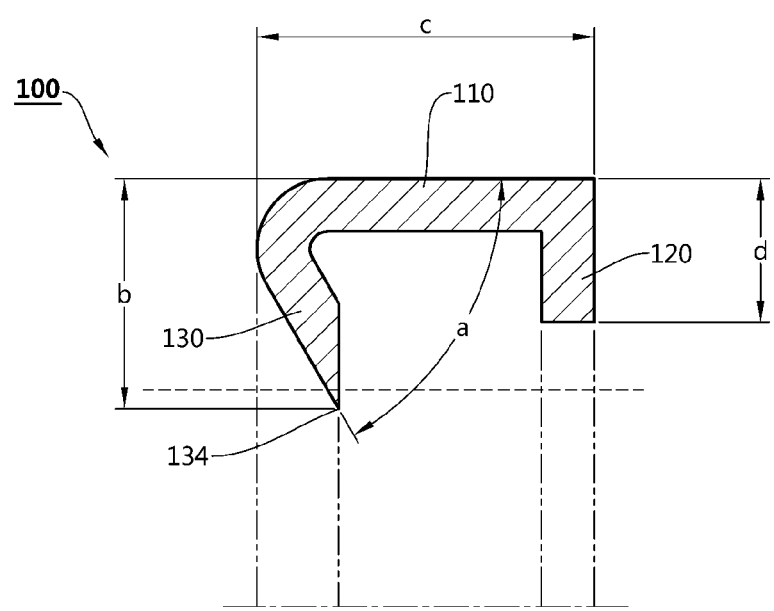
FIG. 4 is a cross-sectional view for explaining a cross-sectional configuration of the stopper grip ring for plumbing pipes, according to the exemplary embodiment of the present disclosure.
Figure 5:
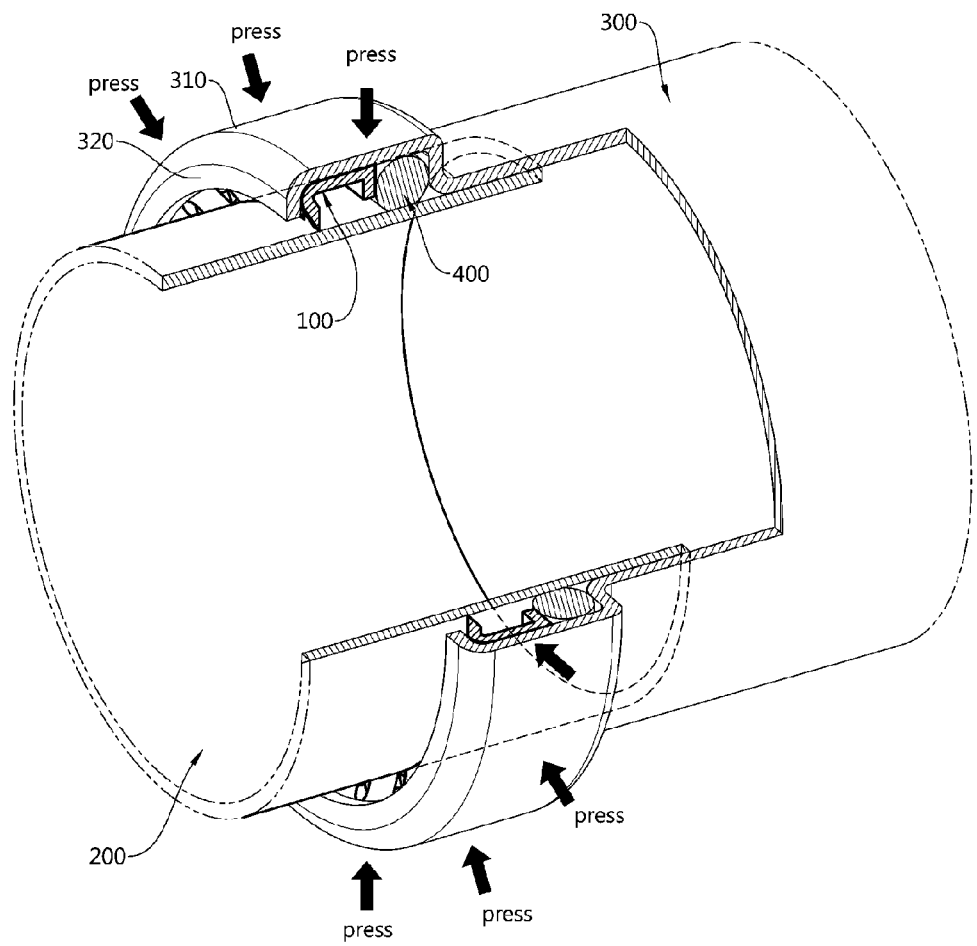
FIGS. 5 and 6 are views for explaining an example in which a pipe connection is performed by using the stopper grip ring for plumbing pipes, according to the exemplary embodiment of the present disclosure.
Figure 6:
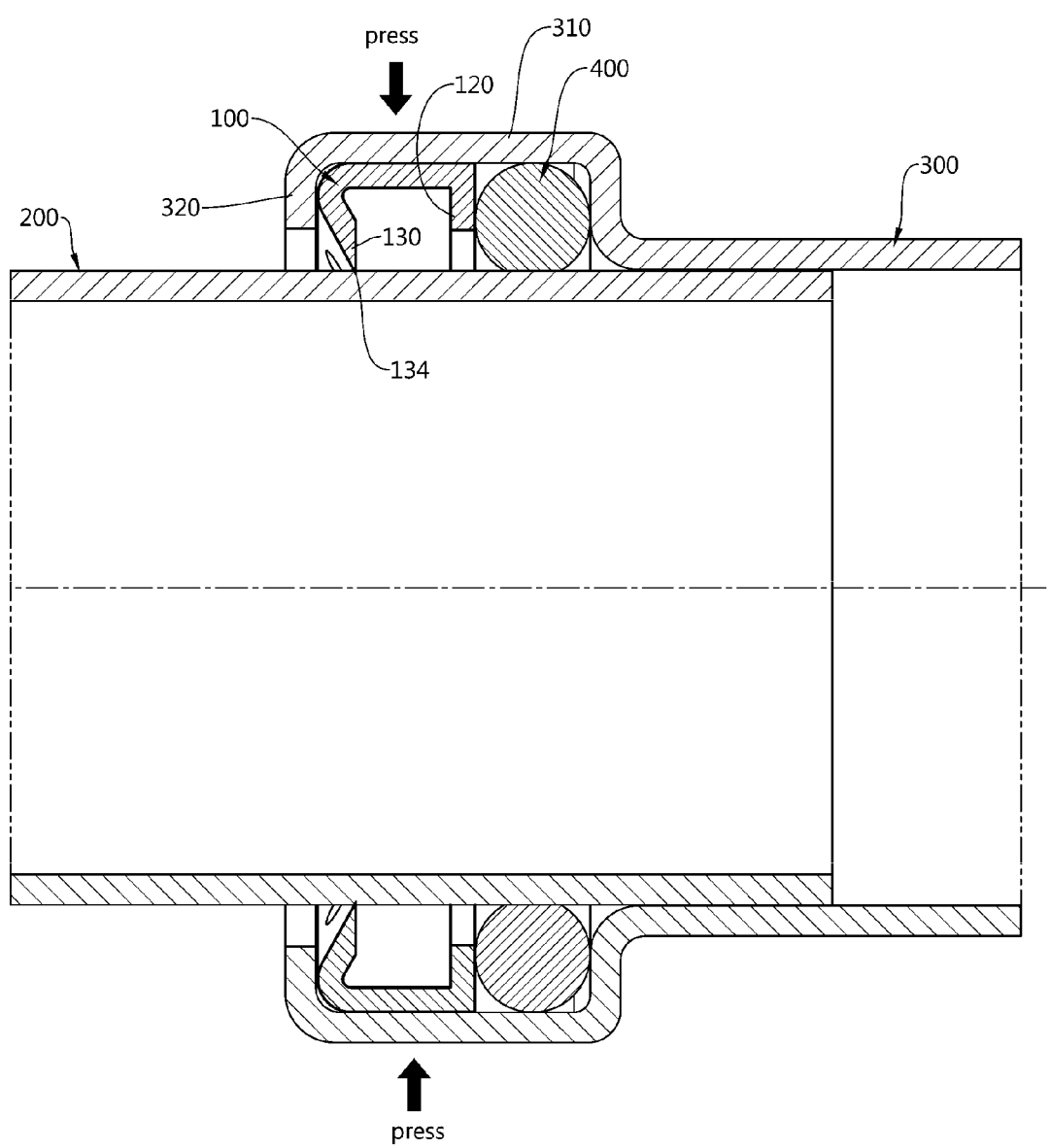

FIGS. 1 and 2 are perspective views for explaining a stopper grip ring for plumbing pipes, according to an exemplary embodiment of the present disclosure. FIG. 3 is a detailed view for explaining both end portions of the stopper grip ring for plumbing pipes, according to the exemplary embodiment of the present disclosure. FIG. 4 is a cross-sectional view for explaining a cross-sectional configuration of the stopper grip ring for plumbing pipes, according to the exemplary embodiment of the present disclosure. FIGS. 5 and 6 are views for explaining an example in which a pipe connection is performed by using the stopper grip ring for plumbing pipes, according to the exemplary embodiment of the present disclosure.

A stopper grip ring 100 according to an exemplary embodiment of the present disclosure has a cross section of a "⊂" shape, and is formed in a ring shape, as a whole.

In more detail, an O-ring supporting portion 120 and a stopper portion 130 are formed at both sides of an outer circumferential portion 110, and thereby the shape of the cross section forms the "⊂" shape.

The aforementioned outer circumferential portion 110 forms an outer diameter of the ring shape.

The aforementioned O-ring supporting portion 120 is formed to be bent at one side of the outer circumferential portion 110 and comes into contact with an O-ring 400. In the O-ring supporting portion 120, an entry inducing portion 122 is formed at one side, i.e., a first end portion 101 to have an inclined shape, and an inserting portion 124 is formed at the other side, i.e., a second end portion 102 so that the inserting portion 124 enters while being induced by the entry inducing portion 122.

That is, a part of an end portion of the inserting portion 124 overlaps at the O-ring supporting portion 120, and thus the entire exterior shape of the stopper grip ring 100 is formed in a circular shape. For this reason, the stopper grip ring 100 may come into contact with the O-ring 400 uniformly over the whole area.

Particularly, as illustrated in FIG. 2, surfaces of the O-ring supporting portion 120 of the stopper grip ring 100 are continuously connected without being cut. As a result, the O-ring 400 is prevented from being interposed between the first end portion 101 and the second end portion 102 even in a case in which the stopper grip ring 100 is made narrower in a process in which the stopper grip ring 100 is fastened, and thereby damage and abnormal deformation of the O-ring 400 is prevented.

The abnormal deformation of the O-ring 400, especially distortion of an unspecified portion is prevented, and therefore deterioration in airtight performance may be prevented.

The aforementioned stopper portion 130 is formed to be bent at the other side of the outer circumferential portion 110, and thus formed to be spaced apart from the O-ring supporting portion 120. A sharpened portion 134 is formed at an edge of the stopper portion 130. The sharpened portion 134 is divided by a plurality of slits 132.

Alternatively, the aforementioned sharpened portion 134 may have hardness greater than that of a pipe to be connected. The sharpened portion 134 may have improved hardness through thermal treatment. For this reason, when a pipe connection is performed, the sharpened portion 134 burrows into an outer diameter of the pipe to be connected, and therefore an operational effect of the stopper may be improved.

Alternatively, as illustrated in FIG. 4, in the stopper grip ring 100 for plumbing pipes, according to the exemplary embodiment of the present disclosure, an angle a between the outer circumferential portion 110 and the stopper portion 130 may be an acute angle. In more detail, the aforementioned acute angle may be 50° to 70°.

The inclined angle of the aforementioned stopper portion 130, i.e., the acute angle is formed to be smaller than 70°, and thereby resistance against an entry of the pipe 200 to be connected may be reduced when the pipes are connected.

The inclined angle of the aforementioned stopper portion 130, i.e. the acute angle is formed to be greater than 50, and thereby the sharpened portion 134 may efficiently burrow into the outer diameter portion of the pipe 200 when a large diameter portion 310 of a connector socket unit 300 to be connected is compressed in a process in which the pipes are connected. As a result, the effect of preventing the pipe 200 from being separated after completing the pipe connection is improved.

In the stopper grip ring 100 for plumbing pipes, according to the exemplary embodiment of the present disclosure, a first width b of the stopper portion 130 may be smaller than a second width c of the outer circumferential portion 110, and may be greater than a third width d of the O-ring supporting portion 120. For this reason, a range that may receive the outer diameter of the pipe 200 is increased. For example, even in a case in which the outer diameter of the pipe 200 is greater than an appropriate outer diameter, the stopper portion 130 may be received while being deformed in a direction in which the stopper portion 130 is bent inward, and the stopper portion 130 does not interfere with the O-ring supporting portion 120.

The O-ring 400 and the stopper grip ring 100 may be sequentially disposed at the large diameter portion 310 of the connector socket unit 300. A complete product may be offered in a state in which the O-ring 400 and the stopper grip ring 100 are included in the connector socket unit 300.

Hereinafter, a pipe connection performed by using the stopper grip ring 100 for plumbing pipes, according to the exemplary embodiment of the present disclosure, will be described with reference to FIGS. 5 and 6.

As the pipe 200 to be connected is fitted into the connector socket unit 300, and the pipe 200 enters and continuously enters the stopper grip ring 100, the pipe 200 comes into contact with the O-ring 400.

After the pipe 200 is fitted into the connector socket unit 300, as described above, the large diameter portion 310 may be compressed by using jigs and tools. Because the jigs and tools used herein are products that may be purchased on the market, a more detailed description will be omitted.

As described above, the pipe connection is completed when the large diameter portion 310 is compressed. Here, a physical pressure is applied to an exterior of the large diameter portion 310, and the pressure may cause a deformation that the first and second end portions 101 and 102 at both sides of the stopper grip ring 100 shrink in a direction in which the first and second end portions 101 and 102 approach each other.

However, in the stopper grip ring 100 according to the exemplary embodiment of the present disclosure, because the O-ring supporting portion 120 is continuously connected without being cut, abnormal deformation or damage of the O-ring 400 is not created.

Therefore, the O-ring 400 may come into close contact with the outer diameter portion of the pipe 200 uniformly over the whole area, and the airtight performance may be stably maintained.

The sharpened portion 134 of the stopper portion 130 may more efficiently burrow into the outer diameter portion of the pipe 200, and thereby may more efficiently prevent the pipe 200 from being separated, with a stronger force.

The stopper grip ring according to the exemplary embodiment of the present disclosure may be used in connecting the pipes.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A stopper grip ring for plumbing pipes, comprising:
   an outer circumferential portion having both end portions which form an outer diameter of an opened "C" shape;
   an O-ring supporting portion extending transversely from one side of the outer circumferential portion for contact with an O-ring and having an entry inducing portion which is formed to be inclined at one end portion, and an inserting portion which is formed at the other end portion and enters while being induced by the entry inducing portion; and
   a stopper portion extending transversely from the other side of the outer circumferential portion so as to be spaced apart from the O-ring supporting portion and having a sharpened portion which is formed at an edge and is divided by a plurality of slits,
   wherein an angle between the outer circumferential portion and the stopper portion is an acute angle.

2. The stopper grip ring of claim 1, wherein the acute angle is 50° to 70°.

3. The stopper grip ring of claim 1, wherein a first width of the stopper portion is smaller than a second width of the outer circumferential portion, and is greater than a third width of the O-ring supporting portion.

4. The stopper grip ring of claim 1, wherein the sharpened portion has hardness greater than that of a pipe to be connected.

* * * * *